United States Patent [19]
Coatta et al.

[11] 3,971,934
[45] July 27, 1976

[54] PHOTOELASTIC LOAD MEASUREMENT ALARM DEVICE

[76] Inventors: Joseph Coatta, 560 Raymur Ave., Vancouver, British Columbia, Canada, V6A 3L2; Charles Leslie Emery, R.R. No. 1, Roseneath, Ontario, Canada

[22] Filed: Aug. 4, 1975

[21] Appl. No.: 601,648

[52] U.S. Cl. .......................... 250/225; 250/231 R; 356/34; 73/88 A; 212/39 MS
[51] Int. Cl.² .......................................... G02F 1/01
[58] Field of Search .......... 250/231 R, 225; 356/33, 356/34, 114; 73/88 A, 143; 340/267 C; 212/39 MS

[56] References Cited
UNITED STATES PATENTS

| | | | |
|---|---|---|---|
| 3,330,154 | 7/1967 | Harbern et al. | 73/143 |
| 3,336,832 | 8/1967 | Snavely | 250/225 X |
| 3,596,100 | 7/1971 | Hollick | 250/225 X |
| 3,672,772 | 6/1972 | Primak | 356/114 X |
| 3,834,550 | 9/1974 | Eiler | 212/39 MS X |
| 3,847,481 | 11/1974 | Paraskevaj et al. | 73/88 A X |
| 3,853,001 | 12/1974 | Mock | 340/267 C X |

*Primary Examiner*—Walter Stolwein
*Attorney, Agent, or Firm*—George H. Riches & Associates

[57] ABSTRACT

This invention relates to a photoelastic load measurement device which measures the load on the cable of the crane by measuring the strain in a particular structural member of the crane and is calibrated to operate an alarm, indicator and/or recorder. A source of polarized light directs a beam of light through a photoelastic plate to an analyzer plate and a photocell. The photoelastic plate is subjected to stress from the structural member which varies with the load on the cable of the crane. The stress in the photoelastic plate subjects the beam of polarized light to temporary double refraction (birefringence), and the intensity of the light received by the photocell through the analyzer plate is dependent upon the degree of retardation of the light in the photoelastic plate. The output signal from the photocell is amplified to operate the alarm, indicator and/or recorder. The device includes apparatus which automatically compensates for changes in ambient temperature and variations in boom angle.

32 Claims, 10 Drawing Figures

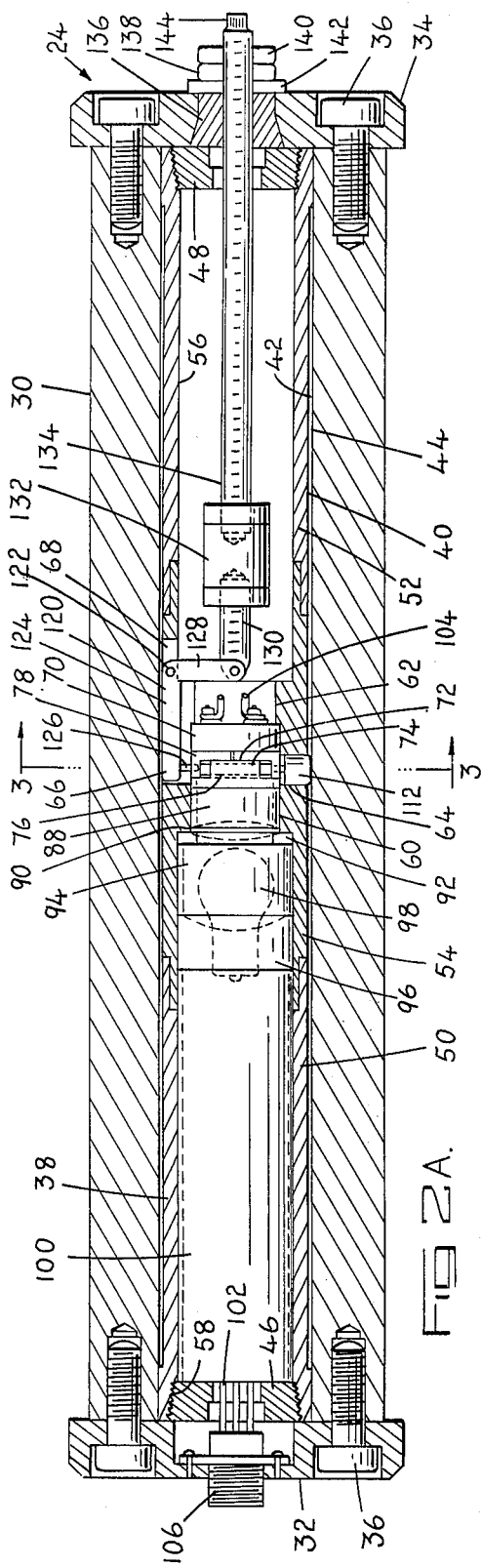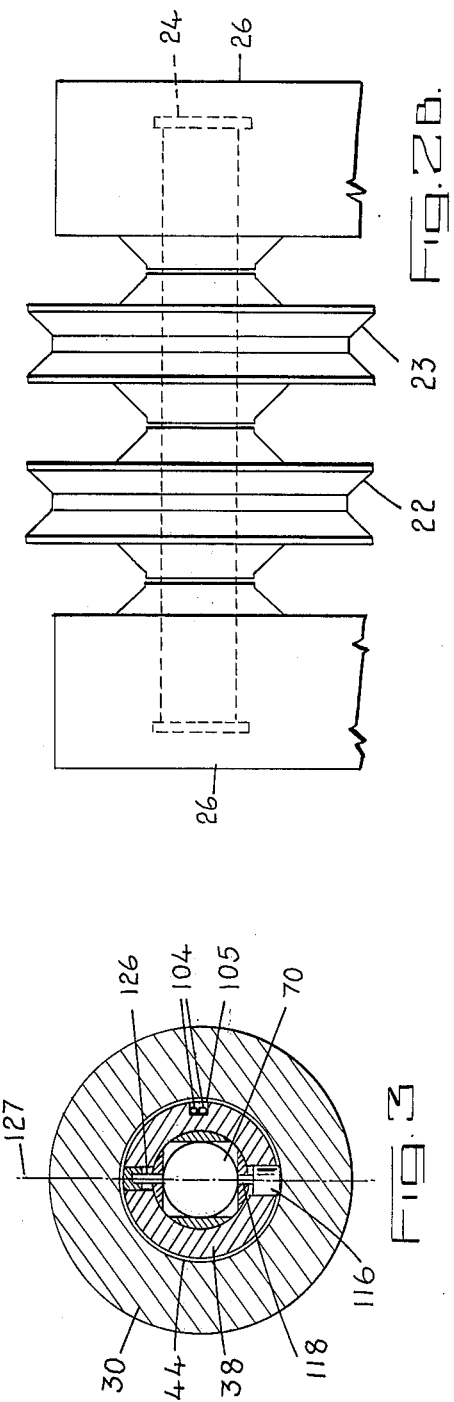

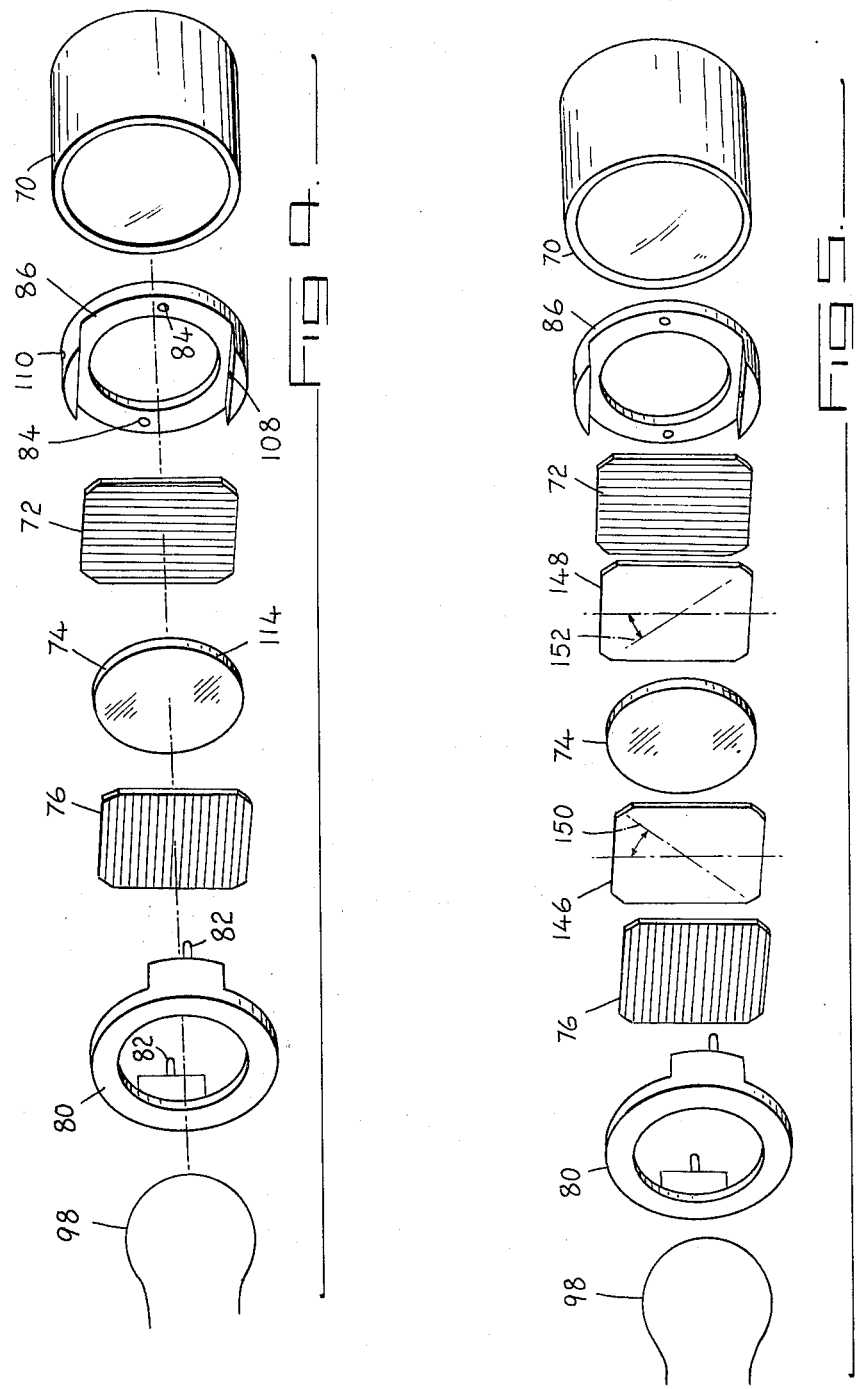

PHOTOELASTIC LOAD MEASUREMENT ALARM DEVICE

BACKGROUND OF THE INVENTION

This invention relates generally to a photoelastic measurement device and more particularly to such a device for measuring loads on a structural member.

In the past, a variety of strain guages, mechanical extensometers and hydraulic devices have been used for this purpose. However, these previous devices have had a number of disadvantages. Those of simple and economic design have not provided the requisite sensitivity and accuracy, while the more complex of these previous devices have been found to be prohibitively expensive. In addition, they are difficult to maintain in accurate adjustment as they are generally subject to physical effects such as changes in temperature and humidity, with automatic compensation being difficult.

Although in describing the present invention, reference is made to embodiments directed to the measurement of load on a crane, it is to be understood that the invention is not restricted to these embodiments, as the device may be used in a large variety of applications wherein a load measuring device is desired which provides an economical combination of simplicity, accuracy and reliability. In this particular field, previous load measurement devices located on the structure or on the cable of a crane have had the disadvantages that they are highly susceptible to damage, and subject to inaccuracies resulting from shock and vibration. In addition, devices located on the cable are subject to wear and inaccuracies occur due to changes in cable dimension with variations in load. Furthermore, these previous devices have not provided suitable automatic compensation for boom angle and ambient temperature variations. The better of these previous devices are very expensive, and even the most satisfactory of them require an extensive degree of maintenance to provide the necessary degree of accuracy and repeatability required.

SUMMARY OF THE INVENTION

Accordingly, it is an object of the present invention to at least partially overcome these disadvantages by providing a photoelastic load measurement device which is relatively economical to manufacture and maintain and which provides an improved combination of simplicity, accuracy and reliability.

To this end, in one of its aspects, the invention provides a photoelastic device adapted to measure stress on a structural member comprising: (a) a source of light adapted to produce a beam of plane polarized light, said source having a first polarization plate, (b) an analyzer plate transversely positioned in the path of the beam, the analyzer plate adapted to transmit light in a second polarization plane, (c) a transparent isotropic photoelastic plate positioned in the path of the beam between the light source and the analyzer plate, the photoelastic plate adapted to retard the beam of light in accordance with the occurrence of strain in the photoelastic plate, (d) a photocell adapted to receive the light transmitted by the analyzer plate and to produce an output signal which varies with the intensity of the light received, said light source, analyzer plate, photoelastic plate and photocell all being fixedly secured relative to the said structural member, (e) means adapted to transmit stress from the structural member to the photoelastic plate to thereby vary the retardation of the beam of light in accordance with the stress applied to the structural member, and (f) receiver means electricity connected to the photocell and adapted to receive the output signal from the photocell and calibrated to indicate the load on the structural member at at least one point over the range of the device.

In another of its aspects, the invention provides a photoelastic device adapted to measure the load on a crane by measuring the strain resulting from the load in a structural member of the crane comprising: (a) a source of light adapted to produce a beam of plane polarized light, said source having a first polarization plane, (b) an analyzer plate transversely positioned in the path of the beam, the analyzer plate adapted to transmit light in a second polarization plane, (c) a transparent isotropic photoelastic plate positioned in the path of the beam between the light source and the analyzer plate, the photoelastic plate adapted to retard the beam of light in accordance with the occurrence of strain in the photoelastic plate, (d) a photocell adapted to receive the light transmitted by the analyzer plate and to produce an output signal which varies with the intensity of the light received, said light source, analyzer plate, photoelectric plate and photocell all being fixedly secured relative to the said structural member, (e) means adapted to transmit stress from the structural member to the photoelastic plate to thereby vary the retardation of the beam of light in accordance with the stress applied to the structural member, and (f) receiver means electrically connected to the photocell and adapted to receive the output signal from the photocell and calibrated to indicate the load on the crane at at least one point over the range of the device.

Further objects and advantages of the invention will appear from the following description taken together with the accompanying drawings.

BRIEF DESCRIPTION OF THE DRAWINGS

FIG. 2A is a longitudinal cut away view of a sheave pin according to the first embodiment shown in FIG. 1;

FIG. 2B is an elevation view showing the assembly of the sheaves on the sheave pin received in the sheave pin housings as seen in FIG. 1;

FIG. 3 is a cross-sectional view taken along line 3—3 in FIG. 2A;

FIG. 4 is an expanded perspective view of the elements located in the central portion of the sheave pin according to the first embodiment seen in FIG. 2A;

FIG. 5 is a view similar to FIG. 4 showing these elements according to a second embodiment of the invention;

DESCRIPTION OF THE PREFERRED EMBODIMENTS

Figure 1:
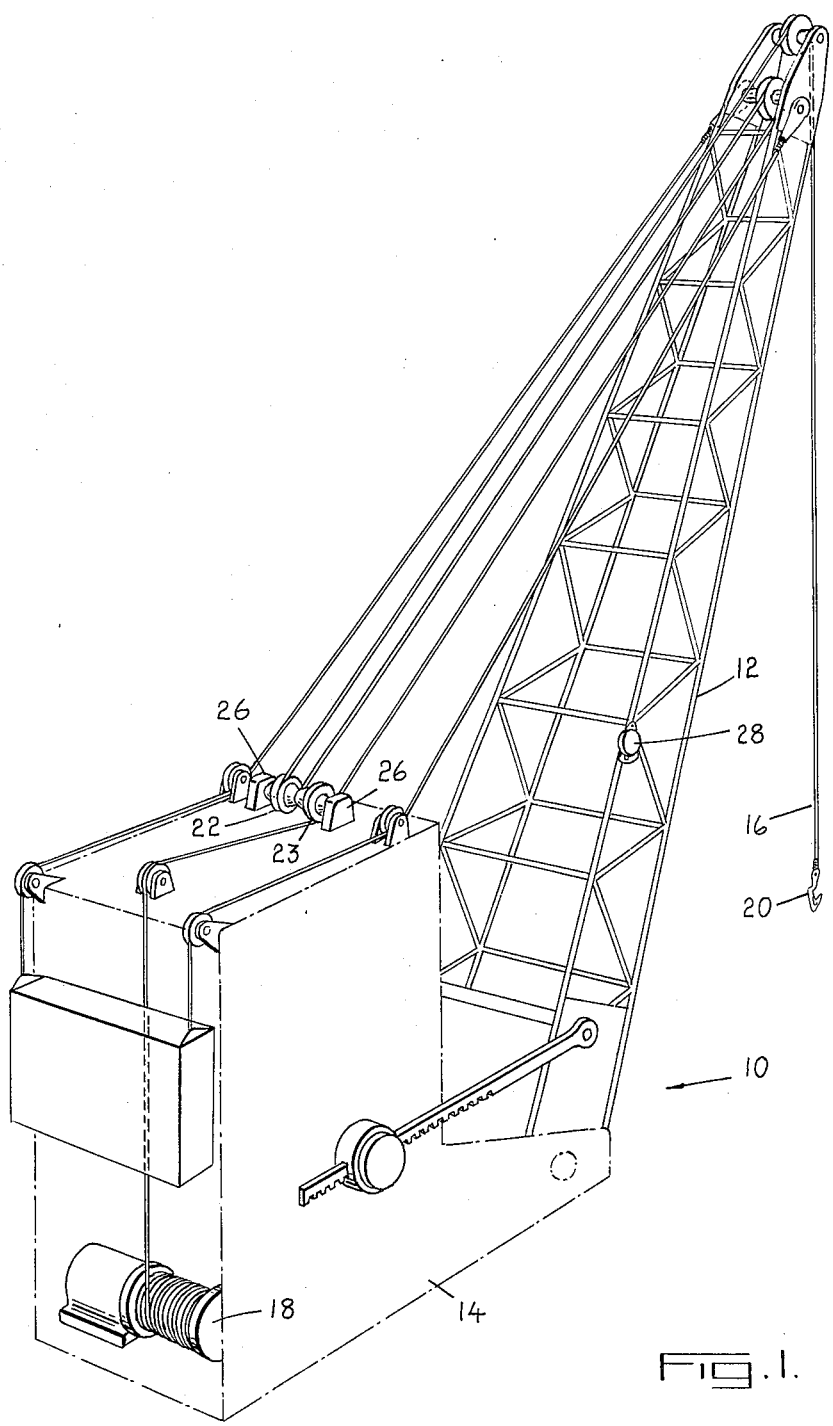
FIG. 1 is a perspective schematic view of a crane incorporating a first embodiment of the invention.

Reference is first made to FIGS. 1 to 4 which show a first embodiment of the invention. The crane 10 has a boom 12 pivotally attached to the body 14 in a convention manner. Cable 16 engages sheaves on the body and the boom in extending from drum 18 to hook 20. In this embodiment, first and second sheaves 21, 22 are rotatably received in sheave pin 24 which is securely positioned by sheave pin housings 26 attached to the body 14, and boom angle compensator 28 is secured to a side member of the boom 12. As may be seen, when a load is picked up on hook 20 by rotating drum 18 to reel in cable 16, transverse stress is applied to the sheave pin 24 by the sheaves 22, 23 which engage the cable, thereby tending to deflect the sheave pin 24 in an upward direction.

Reference is now specifically made to FIGS. 2A and 3 in describing the structure of the sheave pin assembly according to the first embodiment of the invention. The sheave pin 24 is formed of a cylindrical outer sleeve 30 with end flanges 32, 34 which are securely fixed to the outer sleeve by bolts 36. Outer sleeve 30 is formed of a relatively strong material with sufficient thickness to withstand the stress applied by the sheaves with only a slight deflection in the direction in which the stress is applied. An inner sleeve 38 is located within the outer sleeve 30 and extends between the end flanges 32, 34. The outer wall 40 of the inner sleeve abuts on the inner wall 42 of the outer sleeve 30 along a short portion adjacent their ends, but along the remaining portion of their lengths the wall 40, 42 are slightly spaced to define a uniform cylindrical space 44 therebetween. Tapered end plugs 46, 48 are threadably received in the respective ends of the inner sleeve 38. In order to facilitate manufacture and assembly, inner sleeve 38 is formed of first and second end portions 50, 52 and central portion 54 which interlock to provide the substantial rigid inner sleeve 38.

While the inner wall 56 of the inner sleeve is generally cylindrical with the exception of tapered end threaded portions 58, first and second adjacent inwardly projecting ridges 60, 62 are formed by the central portion 54 of the inner sleeve 38 to longitudinally locate the elements hereinbelow described. The central portion 54 of the inner sleeve 38 also has a cylindrical radial opening 64 extending through the first inwardly projecting ridge 60 diametrically opposite a first end 66 of a longitudinal slot 68 also provided in the central portion 54 of the inner sleeve 38.

As may be seen in FIG. 2A, the components shown in FIG. 4 are securely located in that some order within the central portion 54 of the inner sleeve 38. A first photocell 70 is located within the first inwardly projecting ridge 60 and abuts on the second inwardly projecting ridge 62. Analyzer plate 72, photoelastic plate 74 and first polarizing plate 76 are securely held by frame 78 which is positioned adjacent the photocell 70. As best seen in FIG. 4, the frame 78 is formed with a first portion 80 which has pins 82 which are received in mating holes 84 in a second portion 86, and secures the flat rectangular analyzer and polarizing plates 72, 76 and the cylindrical photoelastic plate 74 from radial or rotational movement. Again referring to FIG. 2A, a first cylindrical spacer 88 is located within the first inwardly projecting ridge 60 between the frame 78 and an optical lens 90. Second and third cylindrical spacers 92, 94 are positioned between first inwardly projecting ridge 60 and light source holder 96. The second cylindrical spacer 92 has a smaller inner diameter than the third cylindrical spacer 94 in order to securely longitudinally retain optical lens 90, while at the same time provide sufficient space for light source 98. A fourth longer cylindrical spacer 100 extending between the light source holder 96 and tapered end plug 46 acts to securely longitudinally retain these elements in the above described positions. Wires 102 extend to outlet socket 106 to connect light source 98 to a transformer from a conventional power source (not shown). Wires 104 similarly extend to outlet socket 106 to connect photocell 70 through an amplifying circuit (not shown) to an alarm, indicator and/or indicator recorder (not shown) normally located in the cab of the crane. Wires 104 run out through a hole (not shown) in the central portion of the inner sleeve 38 and are received in longitudinal slots 105 which extend along a portion of the lengths of the central portion 54 and the first end portion 50 of the inner sleeve 38 past the light source 98 to a second hole (not shown), through which the wires 104 pass into the interior of the inner sleeve 38 and from there to the outlet socket 106.

The frame 78 which holds the analyzer plate 72, photoelastic plate 74 and polarizing plate 66 has first and second small radial holes 108, 110 extending therethrough which are located diametrically opposite in alignment with the photoelastic plate 74. As may be best seen in FIG. 3, a pressure pin 112 is located in abutting relationship between the inner wall 42 of outer sleeve 30 and the outer edge 114 of photoelastic plate 74. The pressure pin 112 has an enlarged substantially cylindrical head 116 located within radial opening 64 in the central portion 54 of the inner sleeve 38 and a smaller first cylindrical shaft 118 which extends through the first radial hole 108 in the frame 78 to contact the outer edge 114 of photoelastic plate 74. Rigid L-shaped pressure transmitting member 120 is pivotally connected to the central portion 54 of inner sleeve 38 by pivotal pin 122 with its horizontal arm 124 located in longitudinal slot 68. As may be seen, the horizontal arm 124 has a second cylindrical shaft 126 fixed to its outer end. This second cylindrical shaft 126 similarly projects through the second radial hole 110 in the frame 78 to contact the outer edge 114 of the photoelastic plate 74. In this way, compressive stress may be applied to the outer edge 114 of the photoelastic plate 74 between the first and second cylindrical shafts 118, 126 which are diametrically located on loading axis 127. In this embodiment, as described below, the sheave pin 24 is rotationally fixed in the sheave pin housings 26 with the loading axis extending towards the boom tip at an angle of 45° to the vertical.

The vertical arm 128 of L-shaped member 120 is pivotally connected at its outer end to one end of first horizontal connecting rod 130. The opposite end of first connecting rod 130 is in turn connected to temperature compensating member 132 which is similarly connected to a second horizontal connecting rod 134. The second horizontal connecting rod 134 extends through end flange 34 and is securely longitudinally fixed in a predetermined position relative thereto by being threadably engaged by tapered pressure adjusting nut 136 and locking nuts 138, 140 which abut on washer 142. The temperature compensating member 132 is normally formed of plastic and expands or contracts with changes in temperature to alter the stress applied to the photoelastic plate 74 through L-shaped member 120. Second connecting rod 134 has a square end portion 144 extending through the end flange 34 which permits temperature compensation calibration by rotating the second connecting rod 134 to alter the longitudinal position of the rod 134 relative to end flange 34.

In the first embodiment shown in FIG. 4, the photocell 70 is a selenium photovoltage cell, the analyzer and polarizing plates 72, 76 are POLAROID (registered trade mark) plane polarizer plates, and the light source 98 is a conventional light bulb. The analyzer plate 72 and polarizing plate 76 are positioned with their respective polarization planes (indicated by the parallel lines) extending perpendicular to each other. The photoelastic plate 74 is formed of a suitable transparent material which exhibits temporary birefringence when stressed. This includes certain types of epoxy compounds, polyesters and optical glass.

In use, the present invention utilizes photoelastic principals to measure the load applied to the cable 16 of the crane 10. The arrangement of components in the first embodiment of the invention as seen in FIG. 4 is a practical embodiment of a crossed (standard) plane polariscope with a sheet of transparent isotropic material which exhibits the condition of temporary double refraction (birefringence) when subject to stress, positioned between the polarizer and analyzer. Referring to "photoelasticity" by Max Mark Frocht, John Wiley and Sons at page 132, it is well established that in a circular polariscope set for extinction:

$$I = I_1 \sin^2 \frac{\alpha p}{2}$$

wherein:
- $I$ — Intensity of light passing through the analyzer and received by the photocell
- $I_1$ — Intensity of incident light
- $\alpha p$ — Phase difference (in degrees) introduced by the photoelastic plate.

Furthermore, on page 137 of the same reference, it is shown that in the case of temporary double refraction when pure compression is applied to a photoelastic plate:

$$\alpha p = -2\pi C t q$$

where:
- $C$ — stress-optic coefficient (constant)
- $t$ — thickness of photoelastic plate
- $q$ — compressive stress on the photoelastic plate As $I_1$, $C$ and $t$ are constants, it is apparent that the intensity $I$ of light received by the photocell will vary with the compressive stress on the photoelastic plate $q$. Therefore, the electrical output of the photocell may be calibrated to indicate the load on the crane which produces the compressive stress on the photoelastic plate. In the first embodiment, when there is no load on the crane, there is no retardation in the photoelastic plate 74 and therefore no light is received by the photocell 70, as the analyzer plate 72 is positioned with its polarization plane at 90° to the polarization plane of the polarizing plate 76. As load is applied, the intensity $I$ of the light received by the photocell increases as retardation of the beam of light increases, until $I$ reaches a maximum of $I_1$ when the retardation introduced by the photoelastic plate 74 $\alpha p$ equals $\pi$.

In use, raising of a load by the cable 16 of the crane 10 results in a force being applied to the sheave pin 24 by the sheaves 22, 23. As the ends of the sheave pin 24 are securely fixed in sheave pin housings 26 with the loading axis 127 extending at 45° to the vertical, this force slightly deflects the outer sleeve 30 in an upward direction towards the tip of the boom 12. Referring to FIG. 2A, it will be seen that this results in inward deflection of a portion of inner wall 42 of outer sleeve 30 into space 44, thereby causing pressure pin 112 to slide radially inward to exert a compressive force on the outer edge 114 of photoelastic plate 74. As the outer edge 114 of photoelastic plate 74 is also in contact with second cylindrical shaft 126, the photoelastic plate 74 is thereby subjected to a diametrical compressive stress spplied along loading axis 127 which increases with the load applied to the crane. As may be seen, the frame 78 serves to retain the photoelastic plate 74 in position without exerting other stresses upon it. The light source 98 directs a first beam of light having an incident intensity $I_1$ through the polarizing and analyzer plates 76, 72 and the photoelastic plate 74 to the photocell 70. As described above, the intensity $I$ of the light received by the photocell 70 and thereby the output signal from the photocell increase with the compressive stress applied to the photoelectric plate 74. The output signal from the photocell 70 is connected through an amplifier circuit to an alarm, indicator and/or recorder, and is calibrated over a predetermined range to accurately measure the load lifted by the crane by lifting loads of known weight.

As described above, temperature compensating member 132 expands and acts through L-shaped member 120 to decrease the compressive force applied by the second cylindrical shaft 126 to photoelastic plate 74 upon increases in ambient temperature, to compensate for a corresponding expansion of the photoelastic plate 74 caused by the temperature change. Similarly, the temperature compensating member 132 acts to decrease the compressive stress in the photoelastic plate 74 to compensate for decreases in ambient temperature. It is apparent that the structure and composition of the temperature compensating member 132, as well as the dimensions of the L-shaped member 120 must be selected to be compatible with the temperature characteristics of the photoelastic plate 74 over a suitable temperature range. In a preferred embodiment the coefficient of expansion of the compensating member 132 is the same as that of the photoelastic plate 74. The temperature compensator may be easily calibrated at any specific ambient temperature by rotating the square end portion 144 of the second connecting rod 134.

In the second embodiment of the invention disclosed in FIG. 5, many of the features are identical to those of the first embodiment described above, and therefore features common to both embodiments are described and shown using the same reference numerals. In this embodiment, first and second quarter-wave plates 146, 148 have been located on opposite sides of the photoelastic plate 74 between the analyzer plate 72 and the polarizing plate 76. These quarter-wave plates 146, 148 are formed of a uniaxial crystal of a predetermined thickness which will produce a phase difference in the beam of light passing therethrough of a quarter of a wave length. The respective optical axes 150, 152 of the first and second wave plates 146, 148 are displaced at 90° relative to each other, thereby providing a crossed (standard) circular polariscope when a source of monochromatic light is used. The frame 78 and central portion 54 of the inner sleeve 38 are of course, adapted in size to receive the additional plates.

The operation of this embodiment of the invention utilizing circular polarization is identical to that described above in regard to the first embodiment utilizing plane polarization, and need not be repeated. It is apparent that this device will also operate when a white light source is used thereby producing elliptical polarization.

Figure 6:
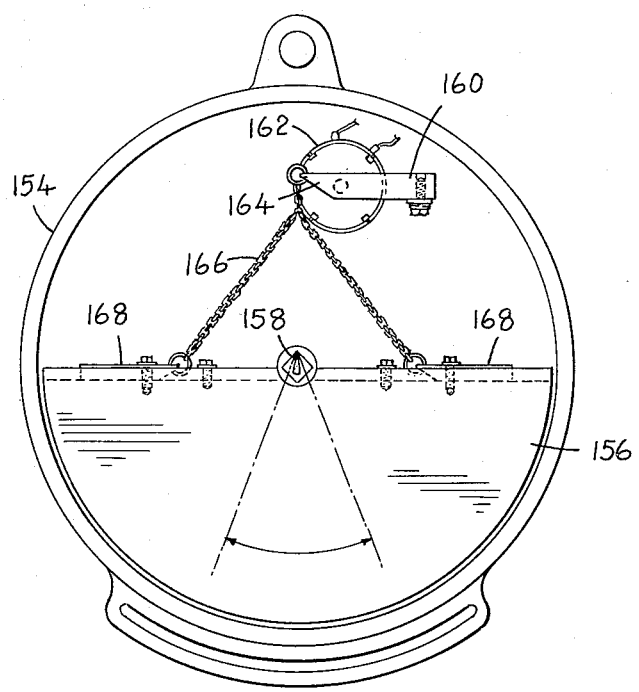
FIG. 6 is a broken away view of the boom angle compensator seen in FIG. 1 according to a first embodiment thereof.

FIG. 6 shows the structure of a first embodiment of the boom angle compensator 28 seen in FIG. 1 attached to the boom 12 of the crane 10. As seen in FIG. 6, the boom angle compensator 28 has a housing 154 which encloses a counterweight 156 which is supported by and pivots on knife edge 158 to maintain a horizontal position as the boom 12 is raised or lowered. Lever 160 is fixed to variable resistor 162 and connected at one end 164 by chain 166 to the counterweight 156. As may be seen, the chain 166 is attached to the counterweight 156 by adjustable chain anchors 168. Variable resistor 162 is electrically connected in series between the power source (not shown) and the light source 98.

In use, the boom angle compensator 28 automatically adjusts for the effects of changes in boom angle, thereby enabling the device to accurately measure the load angle compensator 28 automatically adjusts for the the cable 16 over a predetermined range of boom angles. As may be seen in FIG. 1, the stress applied to the sheave pin 24 by second sheave 23 varies for any given load on the cable 16 with the angle of the boom 12. As described above, the sheave pin 24 is rotationally fixed in sheave pin housings 26, and in this embodiment, the loading axis 127 through first and second cylindrical shafts 118, 126 extends at 45° to the vertical. Therefore for any given load on the cable, maximum stress is applied to the photoelastic plate 74 when the boom 12 is in a central position with the cables extending at 45° to the vertical between sheaves 22, 23 and the boom tip, and it decreases as the boom is moved in or out from this position. The boom angle compensator 28 is fixed to the boom 12 with the housing 154 in the vertical position seen in FIG. 6 when the boom 12 is in this central position. As the boom moves in or out from this central position, counterweight 156 pivots on knife edge 158 and chain 166 rotates variable resistor 162 from its maximum position. Therefore, the intensity $I_1$ of the light from light source 98 is a maximum when the boom is in the central position, and decreases gradually as the boom 12 moves in either direction. The boom angle compensator 28 is precalibrated by adjusting the chain anchors 168 to provide that this change in light intensity corresponds accurately to the variations in stress applied to the photoelastic plate 74 for a fixed load over the full range of boom positions.

Figure 7:
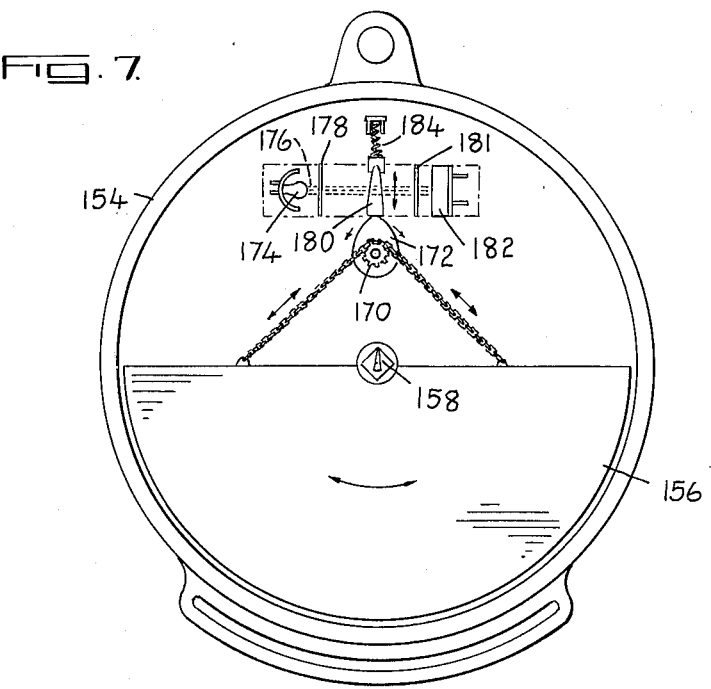
FIG. 7 is a view similar to FIG. 6 showing the boom angle compensator according to a second embodiment.

FIG. 7 illustrates the structure of a second embodiment of the boom angle compensator, and as many of the features are identical to those of the first embodiment, features common to both embodiments are described and illustrated using the same reference numerals. In this second embodiment, the chain 166 engages teeth 170 to rotate cam 172 when counterweight 156 pivots on knife edge 158. A second light source 174 is fixed to the housing 154 of the compensator 28 to direct a second beam of light 176 through a second polarizing plate 178, a crystal wedge 180, and a second analyzer plate 181 to a second photocell 182. The crystal wedge 180 (which is normally formed of quartz) is tapered away from the cam 172 and spring loaded by spring 184 to move linearly across the second beam of light 176 as cam 172 is rotated. The output of second photocell 182 is amplified and electrically connected to first light source 98.

In use, as described above in regard to the first embodiment, this second embodiment of the boom angle compensator 28 is shown in FIG. 7 in the central position of the boom in which maximum stress is applied to photoelastic plate 74. As the boom is moved in either direction from this position, counterweight 156 pivots relative to housing 154, and quartz wedge 180 moves linearly downward. The quartz wedge 180 retards the second beam of polarized light 176 in direct proportion to its thickness. Therefore, as the quartz wedge 180 moves downward due to rotation of cam 172, the light received by second photocell 182 increases. In this way, the intensity of first light source 98 is automatically compensated to increase corresponding to the decrease in the stress received by the photoelastic plate 74 as the boom is moved in either direction from this central position.

Figure 8:
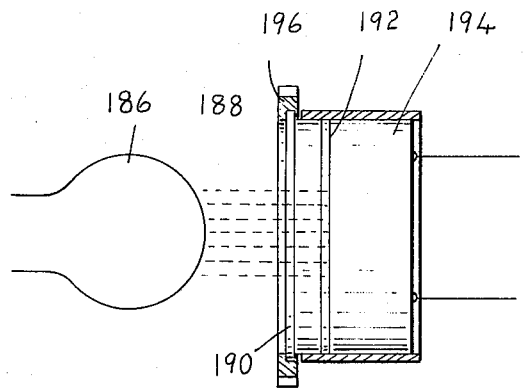
FIG. 8 is a sectional schematic view of a boom angle compensator according to a third embodiment.

FIG. 8 is a schematic view of a further embodiment of a boom angle compensator which may be used with the first embodiment of the invention to provide goniometric compensation. A third light source 186 directs a third beam of light 188 through a third POLAROID polarizing plate 190 and a third POLAROID analyzer plate 192 to a third photocell 194. The light source 186, analyzer plate 192 and photocell 194 are fixed so that they do not rotate when the boom is moved in or out. The polarizing plate 190 is received in holder 196 which is connected through linkage (not shown) to the boom 12 to rotate as the boom is moved in or out from the above described central position. The polarizing plate 190 and analyzer plate 192 are positioned to have their respective polarizing planes perpendicular to each other in the central boom position in which maximum stress is applied to the photoelastic plate 74 for any given load. The output of third photocell 194 is electrically connected to the output of the first photocell 70 in such a manner that increases in the output of third photocell 194 will automatically compensate for decreases in the output of first photocell 70 and the boom is moved in either direction from this central position.

Alternatively, in an embodiment utilizing circular or elliptical polarization, the analyzer plate 192 rather than the polarizing plate 190 may be connected to rotate as the boom moves to change the positions of the polarizing planes relative to each other.

It is, of course, apparent that the photoelastic device according to the invention may be located in another sheave pin in another location on the crane, such as at the tip of the boom. In such a case, these embodiments of the boom angle compensator are adapted accordingly. In one such arrangement, the sheave pin 24 as a whole does not rotate, but the first polarizing plate 76 is connected through linkage (not shown) to rotate with movement of the boom. In this way, goniometric boom angle compensation similar to that described above in regard to FIG. 8, is provided all in a single unit.

In addition to being readily adaptable to temperature and boom angle compensation, the device according to the invention is not effected by humidity. In fact, in one embodiment of the invention the interior of sheave pin 24 is filled with a suitable transparent or translucent liquid to provide additional protection against shock or vibration. In the embodiment, the interior electrical connections must, of course be water proofed.

Figure 9:
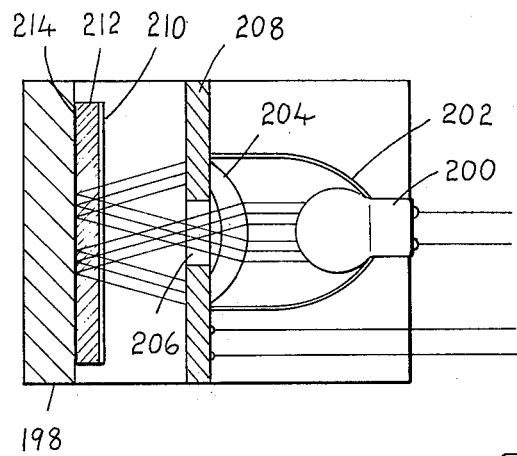
FIG. 9 is a sectional schematic view of a photoelastic load measurement device according to a further embodiment of the invention.

A further embodiment of a photoelastic load measurement device according to the invention is shown in schematic form in FIG. 9. The components of the device are fixed in the positions shown relative to a structural member 198 of the crane which is subjected to stress which varies with the load on the cable 16. The beam of light from a further light source 200 with a reflector 202 is focused by a lens 204 through an aperture 206 in a further photocell 208. The beam of light diverges from the aperture and then passes through a further POLAROID plate 210 and photoelastic plate 212 which is secured to structural member 198 by a layer 214 of reflected glue. The beam of light is reflected from this layer of reflective glue and passes back through the photoelastic plate 212 and POLAROID plate 210 on a divergent path and is received by the photocell 208 which defines aperture 206. As may be seen, this arrangement acts as a parallel plane polariscope with the POLAROID plate 210 acting as both the polarizing plate and analyzer plate. The stress in structural member 198 is transmitted to the photoelastic plate 212 by the adhesive, and the effective thickness of photoelastic plate 212 is twice its actual thickness. As described above, the output signal from the photocell 208, which in this case decreases with increased load, is calibrated with the load on the cable of the crane to operate an alarm, indicator and/or recorder. In a similar embodiment of the invention, the transparent photoelastic plate itself forms a structural member of the crane.

Although the disclosure describes and illustrates preferred embodiments of the invention, it is to be understood that the invention is not restricted to these particular embodiments.

What I claim is:

1. A photoelastic device adapted to measure stress on a structural member comprising:
    a. a source of light adapted to produce a beam of plane polarized light, said source having a first polarization plane,
    b. an analyzer plate transversely positioned in the path of the beam, the analyzer plate adapted to transmit light in a second polarization plane,
    c. a transparent isotropic photoelastic plate positioned in the path of the beam between the light source and the analyzer plate, the photoelastic plate adapted to retard the beam of light in accordance with the occurrence of strain in the photoelastic plate,
    d. a photocell adapted to receive the light transmitted by the analyzer plate and to produce an output signal which varies with the intensity of the light received, said light source, analyzer plate, photoelectric plate and photocell all being fixedly secured relative to the said structural member.
    e. means adapted to transmit stress from the structural member to the photoelastic plate to thereby vary the retardation of the beam of light in accordance with the stress applied to the structural member, and
    f. receiver means electrically connected to the photocell and adapted to receive the output signal from the photocell and calibrated to indicate the load on the structural member at at least one point over the range of the device.

2. A device as claimed in claim 1 wherein the first polarization plane extends at 90° relative to the second polarization plane.

3. A device as claimed in claim 1 further including a first quarter-wave plate positioned in the path of the beam of light between the light source and the photoelastic plate and a second quarter-wave plate positioned in the path of the beam of light between the photoelastic plate and the analyzer plate.

4. A device as claimed in claim 2 further including a first quarter-wave plate positioned in the path of the beam of light between the light source and the photoelastic plate and a second quarter-wave plate positioned in the path of the beam of light between the photoelastic plate and the analyzer plate, the first and the second quarter-wave plates respectively having first and second optic axis extending transversely to the beam of light, the first and second optic axis extending at an a of 90° relative to each other.

5. A device as claimed in claim 3 wherein the first polarization plane extends parallel to the second polarization plane, and the first and second quarter-wave plates respectively have first and second optic axis which extend parallel to each other transversely to the beam of light.

6. A device as claimed in claim 1 wherein the source of polarized light comprises a source of unpolarized light adapted to produce a beam of unpolarized light and a polarizing plate positioned in the beam having the said first polarization plane.

7. A device as claimed in claim 1, wherein the source of polarized light comprises a source of unpolarized monochromatic light adapted to produce a beam of unpolarized light and a polarizing plate positioned in the beam having the said first polarization plane.

8. A photoelastic device adapted to measure the load on a crane by measuring the stress resulting from the load on a structural member of the crane comprising:
    a. a source of light adapted to produce a beam of plane polarized light, said source having a first polarization plane,
    b. an analyzer plate transversely positioned in the path of the beam, the analyzer plate adapted to transmit light in a second polarization plane,
    c. a transparent isotropic photoelastic plate positioned in the path of the beam between the light source and the analyzer plate, the photoelastic plate adapted to retard the beam of light in accordance with the occurrence of strain in the photoelastic plate,
    d. a photocell adapted to receive the light transmitted by the analyzer plate and to produce an output signal which varies with the intensity of the light received, said light source, analyzer plate, photoelectric plate and photocell all being fixedly secured relative to the said structural member,
    e. means adapted to transmit stress from the structural member to the photoelastic plate to thereby vary the retardation of the beam of light in accordance with the stress applied to the structural member, and
    f. receiver means electrically connected to the photocell and adapted to receive the output signal from the photocell and calibrated to indicate the load on the crane at at least one point over the range of the device.

9. A device as claimed in claim 8 wherein the first polarization plane extends at 90° relative to the second polarization plane.

10. A device as claimed in claim 9 further including;
   g. a first quarter-wave plate positioned in the path of the beam of light between the light source and the photoelastic plate, and
   h. a second quarter-wave plate positioned in the path of the beam of light between the photoelastic plate and the analyzer plate.

11. A device as claimed in claim 9 further including;
   g. a first quarter-wave plate positioned in the path of the beam of light between the light source and the photoelastic plate,
   h. a second quarter-wave plate positioned in the path of the beam of light between the photoelastic plate and the analyzer plate, the first and second quarter-wave plates respectively having first and second optic axis extending transversely to the beam of light, the first and second optic axis extending at an angle of 90° relative to each other.

12. A device as claimed in claim 10 wherein the first polarization plane extends parallel to the second polarization plane, and the first and second quarter-wave plates respectively have first and second optic axis which extend parallel to each other transversely to the beam of light.

13. A device as claimed in claim 8, wherein the source of polarized light comprises a source of unpolarized light adapted to produce a beam of unpolarized light ad a polarizing plate positioned in the beam having the said first polarizing plane.

14. A device as claimed in claim 8, wherein the source of polarized light comprises a source of unpolarized monochromatic light adapted to produce a beam of unpolarized light and a polarizing plate positioned in the beam having the said first polarization plane.

15. A device as claimed in claim 8, wherein the receiver means comprises an alarm adapted to indicate when the load on the crane reaches a predetermined value.

16. A device as claimed in claim 8, wherein the receiver means comprises an indicator mounted to indicate to an operator of the crane the load on crane at any particular time over the range of the device.

17. A device as claimed in claim 8, wherein the receiver means comprises a conventional indicating recorder.

18. A device adapted to measure the load on the cable of a crane as claimed in claim 8, wherein the said structural member is a sheave pin located to carry at least one cable engaging sheave, the sheave pin having a hollow shaft defined by a cylindrical wall, and elements (a) to (e) are located within the hollow shaft of the sheave pin.

19. A device adapted to measure the load on a cable of a crane as claimed in claim 11 wherein the said structural member is a sheave pin located to carry at least one cable engaging sheave, the sheave pin having a hollow shaft defined by a cylindrical wall, and elements (a) to (e) and (g) and (h) are located within the hollow shaft of the sheave pin.

20. A device as claimed in claim 19 wherein the beam of light extends parallel to the longitudinal axis of the sheave pin, and further including frame means adapted to securely fix the polarizing plate, the first quarter-wave plate, the photoelastic plate, the second quarter-wave plate, and the analyzer plate in parallel abutting relationship in the path of the beam of light, the frame means being securely fixed relative to the ends of the sheave pin and spaced from the wall of the sheave pin in the hollow shaft centrally between the ends of the sheave pin.

21. A device as claimed in claim 18 wherein the photoelastic plate is disc shaped and the stress transmission means comprises a first radial pin slidably extending through a first opening in the frame means, the first radial pin being in contact with the photoelastic plate and the cylindrical wall of the sheave pin, whereby deformation of the wall of the sheave pin due to the application of a load to the crane results in corresponding diametrical stress being applied to the photoelastic plate.

22. A device as claimed in claim 1 further including temperature compensating means adapted to compensate for changes in stress applied to the photoelastic plate by expansion or contraction of components of the device due to changes in temperature.

23. A device as claimed in claim 20 wherein the temperature compensating means includes a temperature compensating element longitudinally located in the hollow shaft of the sheave pin with one end secured to one end of the sheave pin, a second radial pin slidably extending through a second opening in the frame means to contact the photoelastic plate in diametrically opposed relationship to the first radial pin, and a lever arrangement connecting the second radial pin to the other end of the temperature compensating element whereby changes in longitudinal dimensions of the compensating element due to temperature changes result in corresponding compensating changes in the diametrical stress applied to the photoelastic plate between the first and second radial pins.

24. A device as claimed in claim 7 further including boom angle compensation means adapted to compensate for variations in stress applied to the photoelastic plate due to changes in the position of the crane boom over a normal operating range for a fixed load.

25. A device as claimed in claim 24 wherein the compensation means comprises:
   g. a housing fixed to the crane boom,
   h. a counterweight pivotally mounted in the housing to rotate with changes in boom angle,
   i. variable resistance means connected to the source of light and adapted to vary the intensity of the beam of polarized light, and
   j. connecting means adapted to connect the counterweight to the variable resistance means, whereby the intensity of the beam of light varies in a predetermined relationship with changes in boom position.

26. A device as claimed in claim 24 wherein the compensation means comprises:
   g. a housing fixed to the crane boom,
   h. a counterweight pivotally mounted in the housing to rotate with changes in boom angle,
   i. plane polariscope means positioned in the housing including a second light source producing a second beam of light directed through a second polarizing plate and a secon analyzer plate to a second photocell, the second photocell having an output adapted to vary the intensith of the said beam of polarized light,
   j. a crystal wedge mounted between the second polarizing plate and the second analyzer plate and adapted to be moved linearly across the second beam of light, and k. positioning means connected to the counterweight and adapted to move the crystal wedge, whereby the intensity of the said beam of polarized light varies in a predetermined relationship with changes in boom position.

27. A device as claimed in claim 24 wherein the compensation means comprises:

g. plane polariscope means including a further light source adapted to produce a further beam of light directed through a further polarizing plate and analyzer plate to a further photocell, the further photocell having an output adapted to vary the output of the first said photocell, and h. further polarizing plate holder and linkage means adapted to connect the further polarizing plate to the boom whereby movement of the boom rotates the further polarizing plate relative to the further analyzer plate, whereby the said output of the first said photocell varies in a predetermined relationship with changes in boom angle.

28. A device as claimed in claim 24 wherein the compensation means comprises:

g. plane polariscope means incuding a further light source adapted to produce a further beam of light directed through a further polarizing plate and analyzer plate to a further photocell, the further photocell having an output adapted to vary the output of the first said photocell and h. further analyzer plate holder and linkage means adapted to connect the further analyzer plate to the boom whereby movement of the boom rotates the further analyzer plate relative to the further polarizing plate, whereby the said output of the first said photocell varies in a predetermined relationship with changes in boom angle.

29. A device as claimed in claim 24 wherein the compensation means comprises polarizing plate holder and linkage means adapted to connect the polarizing plate to the boom whereby movement of the boom rotates the polarizing plate relative to the analyzer plate, whereby the output of the photocell varies in a predetermined relationship with changes in boom angle.

30. A device as claimed in claim 24 wherein the compensation means comprises analyzer plate holder and linkage means adapted to connect the analyzer plate to the boom whereby movement of the boom rotates the analyzer plate relative to the polarizing plate, whereby the output of the photocell varies in a predetermined relationship with changes in boom angle.

31. A device as claimed in claim 6 wherein the beam of light diverges through a central aperture in the photocell, the analyzer plate and polarizing plate are common and located between the photocell and the photoelastic plate, and further including a reflective layer located on the side of the photoelastic plate opposite the said common plate.

32. A device as claimed in claim 31 wherein the reflective layer is reflective glue securing the photoelastic plate to the structural member, thereby providing the stress transmission means.

* * * * *